(12) United States Patent
Morris (10) Patent No.: US 9,588,936 B1
(45) Date of Patent: *Mar. 7, 2017

(54) AUTOMATICALLY TRANSMITTING A WEB BROWSER FILE OVER THE INTERNET WHEN BOOTING AN OPERATING SYSTEM FROM A DATA STORAGE DEVICE

(75) Inventor: James Dean Morris, Newport Coast, CA (US)

(73) Assignee: Western Digital Technologies, Inc., Irvine, CA (US)

(*) Notice: Subject to any disclaimer, the term of this patent is extended or adjusted under 35 U.S.C. 154(b) by 1848 days.

This patent is subject to a terminal disclaimer.

(21) Appl. No.: 12/534,076

(22) Filed: Jul. 31, 2009

(51) Int. Cl.
*G06F 9/445* (2006.01)
*G06F 15/177* (2006.01)

(52) U.S. Cl.
CPC .................. *G06F 15/177* (2013.01)

(58) Field of Classification Search
None
See application file for complete search history.

(56) References Cited

U.S. PATENT DOCUMENTS

| 6,691,113 | B1 | 2/2004 | Harrison et al. |
| 6,948,165 | B1 | 9/2005 | Luu et al. |
| 6,963,901 | B1* | 11/2005 | Bates et al. .................. 709/206 |
| 6,999,913 | B2 | 2/2006 | Hensley |
| 7,506,335 | B1* | 3/2009 | Wooff et al. .................. 717/173 |
| 7,526,762 | B1* | 4/2009 | Astala et al. ................. 717/171 |
| 2002/0078192 | A1 | 6/2002 | Kopsell et al. |
| 2002/0143770 | A1* | 10/2002 | Schran et al. .................. 707/10 |
| 2003/0046371 | A1* | 3/2003 | Falkner .......................... 709/220 |
| 2004/0015580 | A1 | 1/2004 | Lu et al. |
| 2007/0168493 | A1 | 7/2007 | Sarwono et al. |
| 2008/0005460 | A1 | 1/2008 | Uemura |
| 2009/0063656 | A1 | 3/2009 | Blumenau et al. |
| 2009/0198987 | A1 | 8/2009 | Sumioka et al. |
| 2009/0287705 | A1 | 11/2009 | Schneider |

OTHER PUBLICATIONS

U.S. Appl. No. 12/534,083, filed Jul. 31, 2009, 11 pages.
Office Action dated Nov. 28, 2011 from U.S. Appl. No. 12/534,083, 13 pages.
Office Action dated Apr. 30, 2012 from U.S. Appl. No. 12/534,083, 11 pages.
Interview Summary dated Jun. 26, 2012 from U.S. Appl. No. 12/534,083, 3 pages.
Office Action dated Jul. 2, 2013 from U.S. Appl. No. 12/534,083, 14 pages.
Office Action dated Jan. 21, 2014 from U.S. Appl. No. 12/534,083, 20 pages.

* cited by examiner

*Primary Examiner* — James D Rutten
(74) *Attorney, Agent, or Firm* — Chang & Hale LLP (57) ABSTRACT

A data storage device is disclosed comprising a non-volatile memory having a host operating system stored in an unprotected area of the non-volatile memory, a device operating system stored in a protected area of the non-volatile memory, and a device application operable to transmit a web browser file over the Internet, the device application stored in the protected area of the non-volatile memory. When a first read command is received from a host to load the host operating system, the device operating system is returned in response to the first read command. A second read command is then received from the host to load the device application.

18 Claims, 8 Drawing Sheets

AUTOMATICALLY TRANSMITTING A WEB BROWSER FILE OVER THE INTERNET WHEN BOOTING AN OPERATING SYSTEM FROM A DATA STORAGE DEVICE

BACKGROUND

Description of the Related Art

Computer systems (e.g., desktops, laptops, portables, etc) typically employ some form of a non-volatile data storage device such as a disk drive, or a solid state drive comprising a non-volatile semiconductor memory such as flash memory. A solid state drive typically emulates a disk drive so that the same communication protocol may be employed. That is, a host typically interfaces with a solid state drive using a standard disk drive communication protocol, such as the Advanced Technology Attachment (ATA) protocol.

Computer systems typically allow access to the Internet using a standard web browser (Internet Explorer, Safari, Firefox, etc.) and therefore have become significant platforms for consumer transactions and advertising. Web browsers store information in configuration files that help facilitate browsing sessions. For example, a website may store a cookie in a browser cookie file, wherein the cookie may include information for authentication and session tracking (state maintenance), or specific information about a user, such as site preferences or the contents of their shopping cart. Each time the user visits a particular website, or browses through different pages of a website, the corresponding cookie information may be transmitted to the website to facilitate the browsing session.

DETAILED DESCRIPTION OF EMBODIMENTS OF THE INVENTION

Figure 1A:
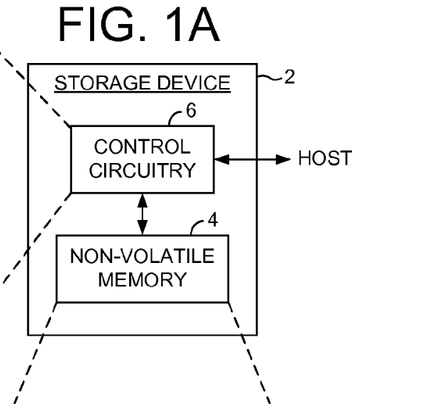
FIG. 1A shows a data storage device according to an embodiment of the present invention comprising a non-volatile memory and control circuitry.
Figure 1B:
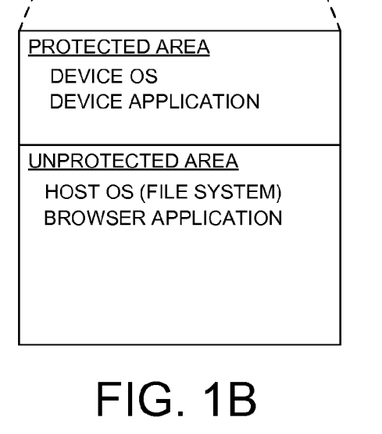
FIG. 1B shows an embodiment wherein the non-volatile memory stores a device operating system and a device application in a protected area inaccessible by the host, and stores a host operating system and browser application in an unprotected area accessible by the host.

FIG. 1A shows a data storage device 2 according to an embodiment of the present invention comprising a non-volatile memory 4 having a host operating system stored in an unprotected area of the non-volatile memory, a device operating system stored in a protected area of the non-volatile memory, and a device application operable to transmit a web browser file over the Internet, the device application stored in the protected area of the non-volatile memory (FIG. 1B). The data storage device 2 further comprises control circuitry 6 for executing the flow diagram of FIG. 1C. When a first read command is received from a host to load the host operating system (step 8), the device operating system is returned in response to the first read command (step 10). A second read command is then received from the host to load the device application (step 12), wherein the device application transmits the web browser file over the Internet (step 14).

In the embodiment of FIG. 1B, the protected area of the non-volatile memory is inaccessible by the host that boots the host operating system. In this manner, the device operating system and the device application are protected from being modified or disabled by the host. Any suitable technique may be employed to reserve the protected area in the non-volatile memory, such as by reserving a number of data locations and corresponding block addresses for internal use only.

Any suitable technique may be employed to return the device operating system instead of the host operating system during the initial boot operation of the data storage device. Suitable techniques are disclosed in U.S. Pat. No. 6,948,165 entitled "METHOD FOR INSTALLING AN APPLICATION PROGRAM TO BE EXECUTED DURING EACH BOOTLOAD OF A COMPUTER SYSTEM FOR PRESENTING A USER WITH CONTENT OPTIONS PRIOR TO CONVENTIONAL SYSTEM STARTUP PRESENTATION WITHOUT REQUIRING A USER'S PARTICIPATION TO INSTALL THE PROGRAM" the disclosure of which is incorporated herein by reference.

Figure 1C:
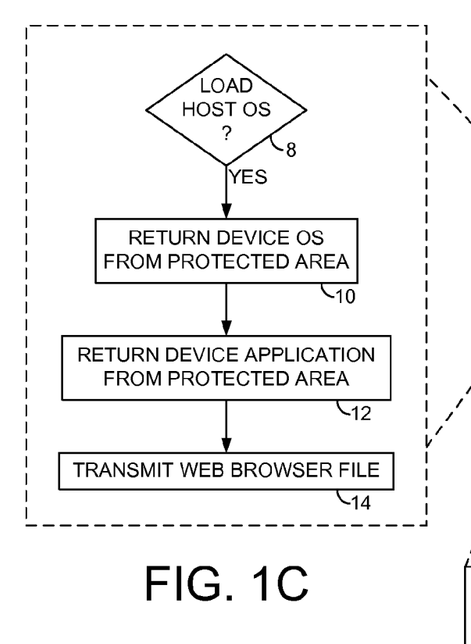
FIG. 1C is a flow diagram executed by the control circuitry according to an embodiment of the present invention wherein when the host requests the host operating system, the storage device returns the device operating system which loads and executes the device application in order to transmit a web browser file over the Internet.
Figure 2A:
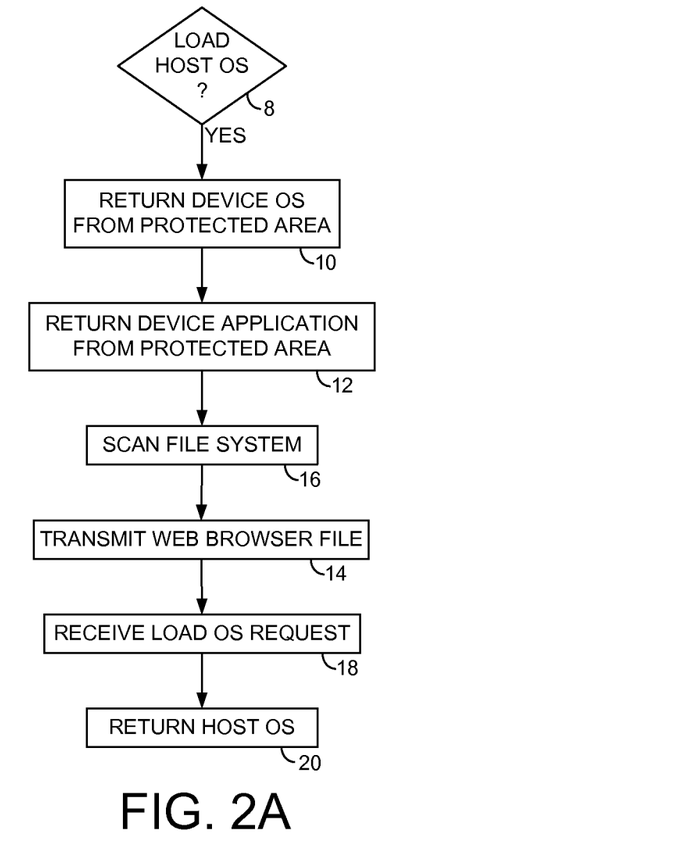
FIG. 2A is a flow diagram according to an embodiment of the present invention wherein the device application scans the file system in the host operating system to find and transmit the web browser file over the Internet.

FIG. 2A is a flow diagram according to an embodiment of the present invention which extends on the flow diagram of FIG. 1C. When the device operating system executes the device application, the device application scans the file system of the host operating system (step 16) in order to locate the target web browser file to be transmitted over the Internet (step 14). After transmitting the web browser file, the device application generates a reboot command to reboot the host so that the host resends a request to load the host operating system (step 18) wherein the data storage device returns the host operating system (step 20). After the host operating system is loaded, the host operates normally including to execute the web browser application.

Figure 2B:
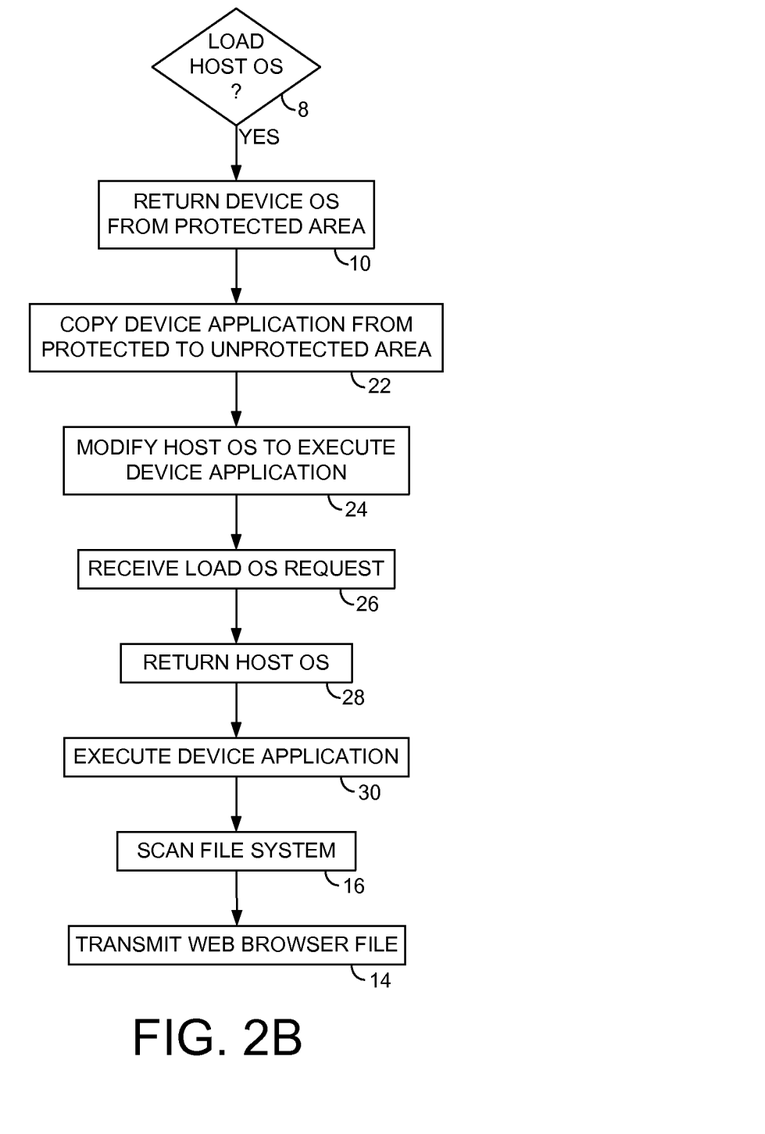
FIG. 2B is a flow diagram according to an embodiment of the present invention wherein the device operating system copies the device application into the unprotected area of the non-volatile memory and modifies the host operating system so that the device application is executed during the boot process.

The device application may be executed in any suitable manner during the boot of the host. FIG. 2B is a flow diagram according to an embodiment of the present invention wherein while executing the device operating system (step 10) the device application is copied from the protected area of the non-volatile memory to the unprotected area (step 22). The host operating system is then modified (step 24) so that the device application is executed automatically when the host operating system is loaded and executed. For example, the device application (or alias) may be copied into a startup folder of the host operating system. The device operating system then generates a reboot command to reboot the host so that the host resends a request to load the host operating system (step 26). The data storage device returns the host operating system (step 28) which then executes the device application (step 30) which scans the file system (step 16) and transmits the target web browser file over the Internet (step 14).

Figure 3A:
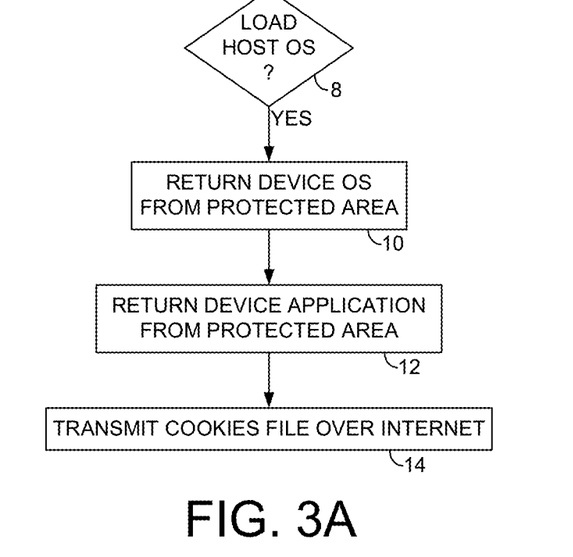
FIG. 3A is a flow diagram according to an embodiment of the present invention wherein the web browser file transmitted over the Internet comprises a cookies file.

In the embodiments of the present invention, any suitable web browser file may be transmitted over the Internet for any suitable web browser (Internet Explorer, Netscape, Safari, Firefox, etc.). FIG. 3A shows an embodiment of the present invention wherein the web browser file transmitted over the Internet comprises a cookies file (step 14). In one embodiment, the cookies file stores cookies generated by various Internet websites, wherein the cookies may include information for authentication and session tracking (state maintenance), or specific information about a user, such as site preferences or the contents of their shopping cart. Each time the user visits a particular website, or browses through different pages of a website, the corresponding cookie information may be transmitted to the website to facilitate the browsing session.

Figure 3B:
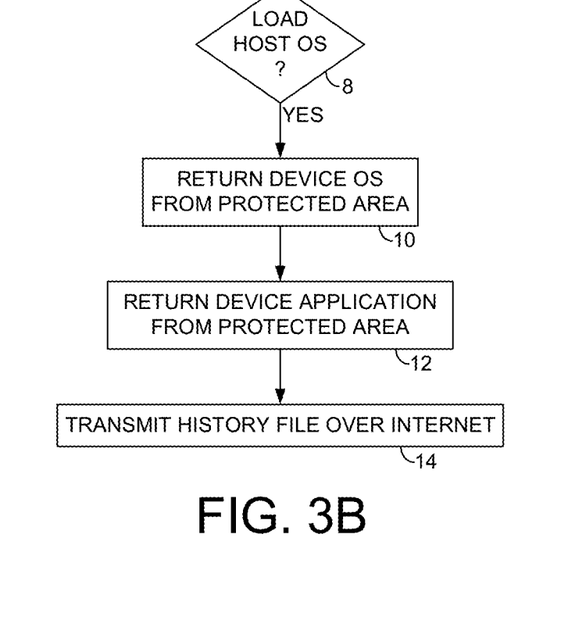
FIG. 3B is a flow diagram according to an embodiment of the present invention wherein the web browser file transmitted over the Internet comprises a history file.
Figure 3C:
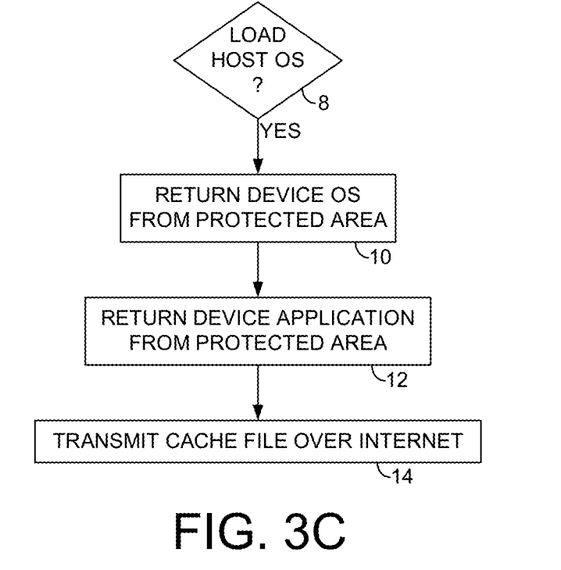
FIG. 3C is a flow diagram according to an embodiment of the present invention wherein the web browser file transmitted over the Internet comprises a cache file.

FIG. 3B shows an embodiment of the present invention wherein the browser file transmitted over the Internet comprises a history file (step 14). The history file stores information related to the history of the web browser, such as a history of websites visited by the user. FIG. 3C shows an embodiment of the present invention wherein the browser file transmitted over the Internet comprises a cache file (step 14). The cache file stores content related to websites visited by the user, such as the content of various web pages visited by the user.

Figure 3D:
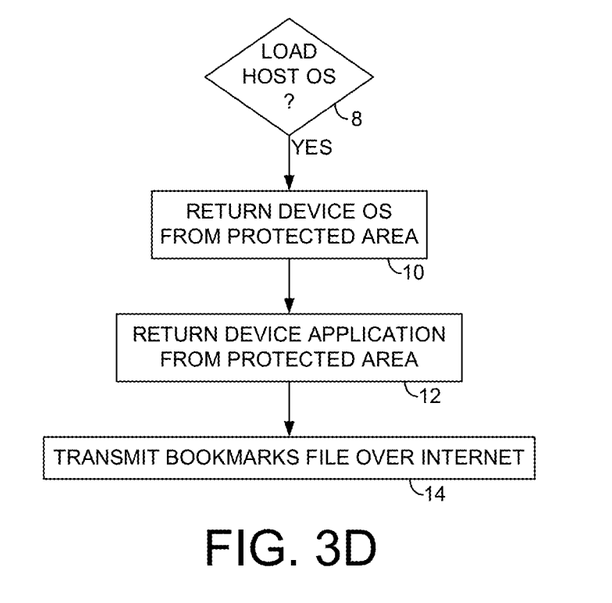
FIG. 3D is a flow diagram according to an embodiment of the present invention wherein the web browser file transmitted over the Internet comprises a bookmarks file.

FIG. 3D shows an embodiment of the present invention wherein the web browser file transmitted over the Internet comprises a bookmarks file (step 14). The bookmarks file stores a list of website addresses for quick access by the user during Internet browsing sessions. The bookmarks may be displayed in any suitable manner, such as in a drop-down menu or in a toolbar of the web browser.

Figure 3E:
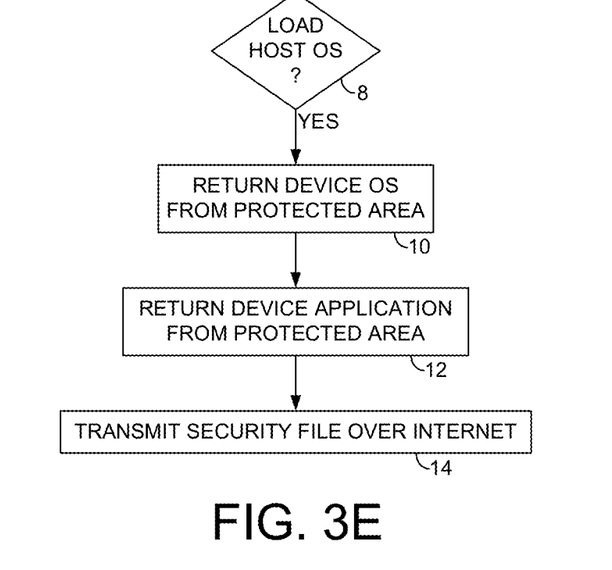
FIG. 3E is a flow diagram according to an embodiment of the present invention wherein the web browser file transmitted over the Internet comprises a security file.

FIG. 3E shows an embodiment of the present invention wherein the web browser file transmitted over the Internet comprises a security file (step 14). The security file may store configuration information for enabling/disabling certain security features of a web browser, such as enabling/disabling various program components (e.g., Java, .NET, ActiveX, etc.) that a website may attempt to download and run on the host computer together with the standard HTML scripts. Alternatively, the security file may store security certificates which enable secure communication between a website and the web browser over the Internet. In one embodiment, the security file comprises a list of websites having a particular security configuration.

Figure 3F:
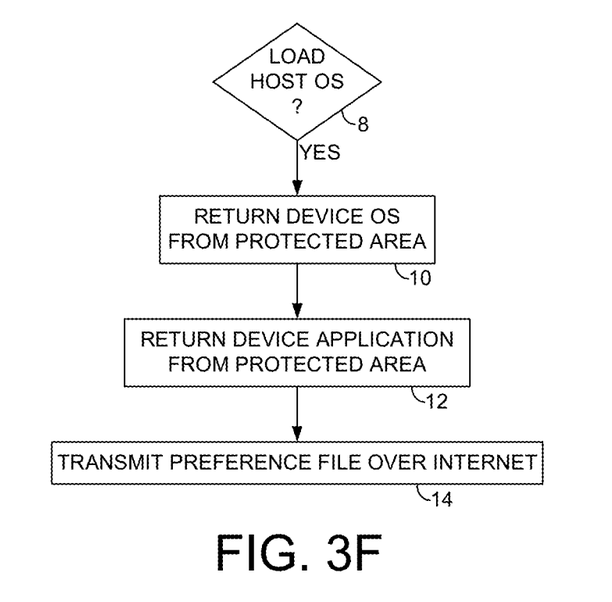
FIG. 3F is a flow diagram according to an embodiment of the present invention wherein the web browser file transmitted over the Internet comprises a preference file.

FIG. 3F shows an embodiment of the present invention wherein the web browser file transmitted over the Internet comprises a preference file (step 14). The preference file may store configuration information, such as the address of a website displayed initially (the homepage) when the web browser is first launched.

Figure 3G:
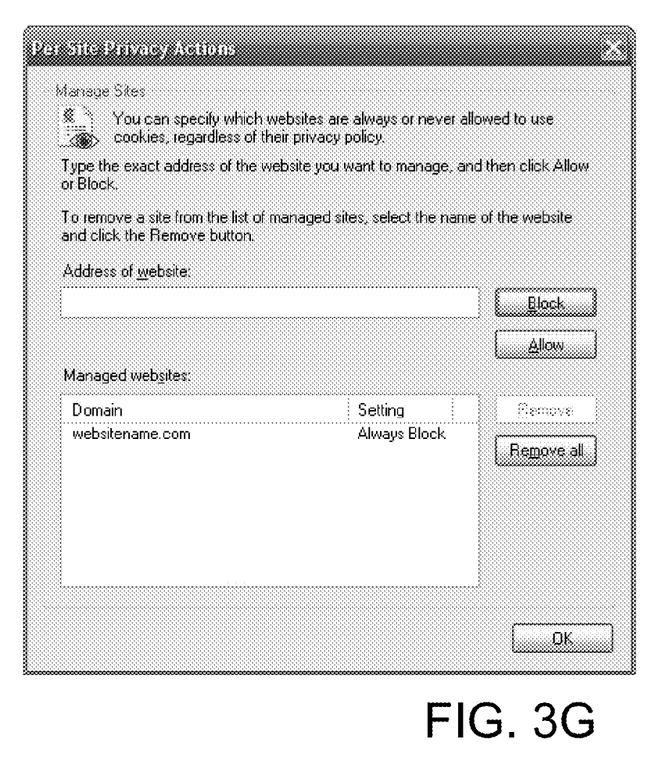
FIG. 3G shows a web browser window for configuring a list of websites that are blocked from storing cookies on the host system.
Figure 3H:
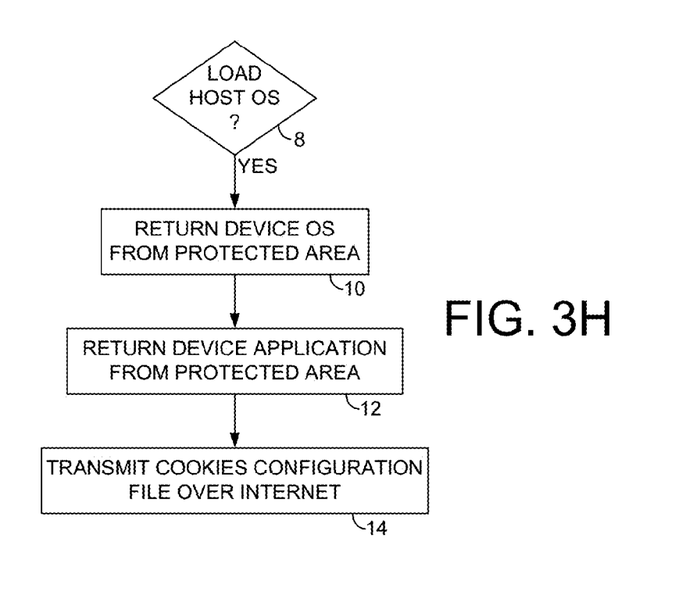
FIG. 3H is a flow diagram according to an embodiment of the present invention wherein the web browser file transmitted over the Internet comprises a cookies configuration file.

FIG. 3G shows a dialog window displayed from a web browser for enabling/disabling cookies for selected websites. For example, if a user wants to block all cookies generated by a particular website, the user enters the address of the website and selects the "Block" button which adds the website address to the list of blocked websites. The list of website addresses and access setting is typically stored in a cookies exclusion file (a configuration file) for the web browser. FIG. 3H is a flow diagram according to an embodiment of the present invention wherein the web browser file transmitted over the Internet comprises a cookies configuration file such as the cookies exclusion file (step 14).

Figure 4:
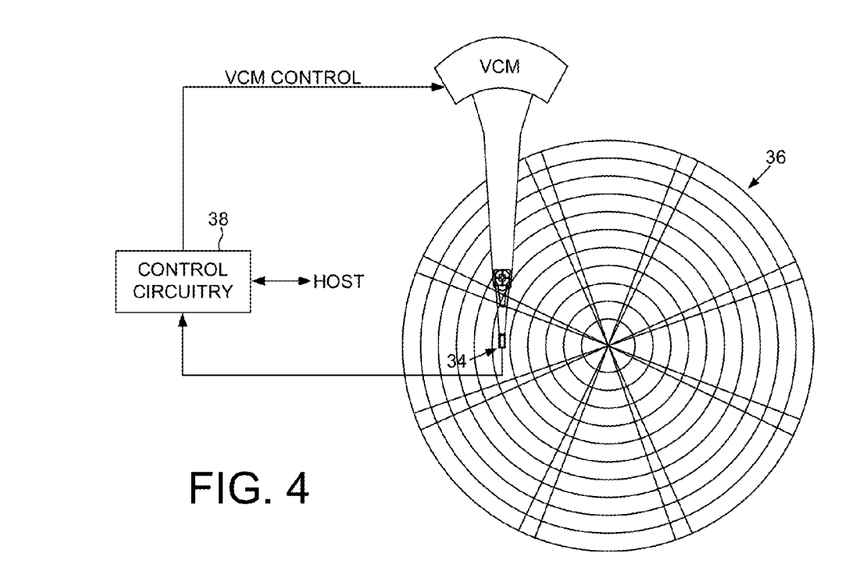
FIG. 4 shows an embodiment wherein the data storage device comprises a disk drive.
Figure 5:
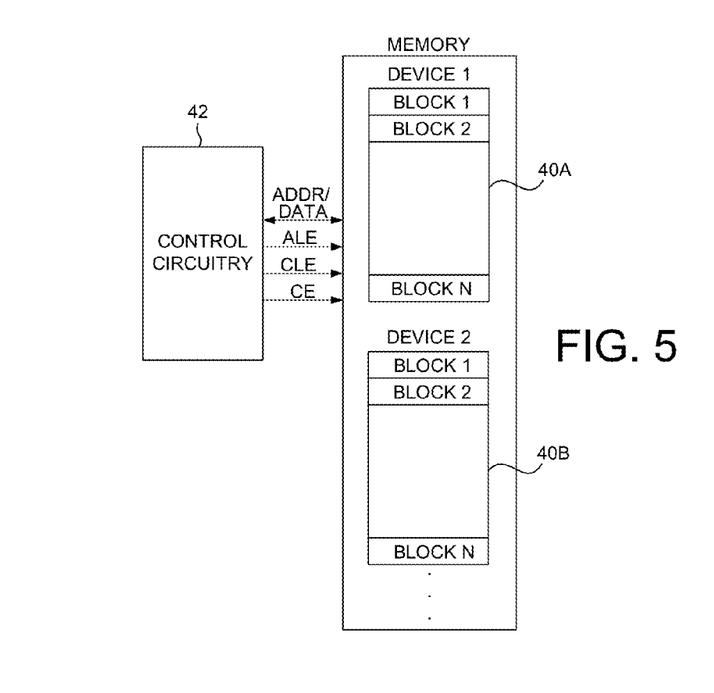
FIG. 5 shows an embodiment wherein the data storage device comprises a solid state drive.

The embodiments of the present invention may be employed in any suitable data storage device. FIG. 4 shows a data storage device comprising a disk drive including a head 34 actuated over a disk 36 and control circuitry 38 for executing the flow diagrams described herein. FIG. 5 shows a solid state drive comprising a plurality of non-volatile semiconductor memories 40A, 40B, etc., such as flash memories, and control circuitry 42 for executing the flow diagrams described herein. A hybrid data storage device may also be employed comprising components of a disk drive shown in FIG. 4 combined with the non-volatile semiconductor memories shown in FIG. 5.

Any suitable control circuitry may be employed to implement the flow diagrams in the embodiments of the present invention, such as any suitable integrated circuit or circuits. In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are read into a volatile semiconductor memory when the data storage device is powered on. In yet another embodiment, the control circuitry comprises suitable logic circuitry, such as state machine circuitry.

What is claimed is:

1. A data storage device comprising:
   a non-volatile memory comprising:
      a host operating system stored in an unprotected area of the non-volatile memory;
      a web browser application stored in the unprotected area of the non-volatile memory;
      a device operating system stored in a protected area of the non-volatile memory; and
      a device application stored in the protected area of the non-volatile memory;
   control circuitry operable to:
      receive a first read command from a host to load the host operating system;

return the device operating system in response to the first read command; and receive a second read command from the host to load the device application, wherein the device application is configured to:
  transmit a web browser file for the web browser application over the Internet, and
  generate a reboot command after transmitting the web browser file, to reboot the host so that the host resends the first read command.

2. The data storage device as recited in claim 1, wherein:
the host operating system comprises a file system including the web browser file; and
the device application is further configured to scan the file system to find the web browser file.

3. The data storage device as recited in claim 1, wherein the web browser file comprises a cookies file.

4. The data storage device as recited in claim 1, wherein the web browser file comprises a history file.

5. The data storage device as recited in claim 1, wherein the web browser file comprises a cache file.

6. The data storage device as recited in claim 1, wherein the web browser file comprises a bookmarks file.

7. The data storage device as recited in claim 1, wherein the web browser file comprises a security file.

8. The data storage device as recited in claim 1, wherein the web browser file comprises a preference file.

9. The data storage device as recited in claim 1, wherein the web browser file comprises a website list for storing websites excluded from storing cookies at the host.

10. A method of operating a data storage device, the data storage device comprising a non-volatile memory comprising:
  a host operating system stored in an unprotected area of the non-volatile memory;
  a web browser application stored in the unprotected area of the non-volatile memory;
  a device operating system stored in a protected area of the non-volatile memory; and
  a device application stored in the protected area of the non-volatile memory;
the method comprising:
  receiving the first read command from the host to load the host operating system;
  returning the device operating system in response to the first read command;
  receiving a second read command from the host to load the device application;
  transmitting a web browser file for the web browser application over the Internet using the device application; and
  generating a reboot command after transmitting the web browser file using the device application, to reboot the host so that the host resends the first read command.

11. The method as recited in claim 10, wherein:
the host operating system comprises a file system including the web browser file; and
the device application is further configured to scan the file system to find the web browser file.

12. The method as recited in claim 10, wherein the web browser file comprises a cookies file.

13. The method as recited in claim 10, wherein the web browser file comprises a history file.

14. The method as recited in claim 10, wherein the web browser file comprises a cache file.

15. The method as recited in claim 10, wherein the web browser file comprises a bookmarks file.

16. The method as recited in claim 10, wherein the web browser file comprises a security file.

17. The method as recited in claim 10, wherein the web browser file comprises a preference file.

18. The method as recited in claim 10, wherein the web browser file comprises a website list for storing websites excluded from storing cookies at the host.

* * * * *